Jan. 28, 1969

J. A. ROSS
SELF-REGULATED RAPID RESPONSE
PHASE-CONTROLLED RECTIFIER 3,424,970

Filed Jan. 14, 1965

INVENTOR.
JAMES A. ROSS
BY Harry R. Lubcke
AGENT

INVENTOR.
JAMES A. ROSS
BY Harry R. Lubcke
AGENT

INVENTOR.
JAMES A. ROSS
BY Harry R. Lubcke
AGENT

3,424,970
SELF-REGULATED RAPID RESPONSE PHASE-CONTROLLED RECTIFIER

James A. Ross, Villa Park, Calif., assignor, by mesne assignments, to L.T.V. Ling Altec, Inc., Anaheim, Calif., a corporation of Delaware
Filed Jan. 14, 1965, Ser. No. 425,564
U.S. Cl. 321—5  17 Claims
Int. Cl. H02m 7/20

ABSTRACT OF THE DISCLOSURE

Typically, a three-phase rectifier is controlled to give a constant voltage output despite variations of input voltage or of the frequency of alternation thereof. Control is accomplished by comparing the input voltages from phases to neutral of the rectifier with a constant voltage and by altering the period of conduction of controllable rectifiers accordingly. The comparison is made when phase to neutral voltages decrease to the magnitude of the constant voltage. Control is exercised within one cycle by a circuit devoid of a servo loop or a time constant. The circuit may employ either a semiconductor switch or a pulse generator, such as a Schmitt trigger. Twelve-phase and voltage-cascaded embodiments are possible.

---

Figure 1:
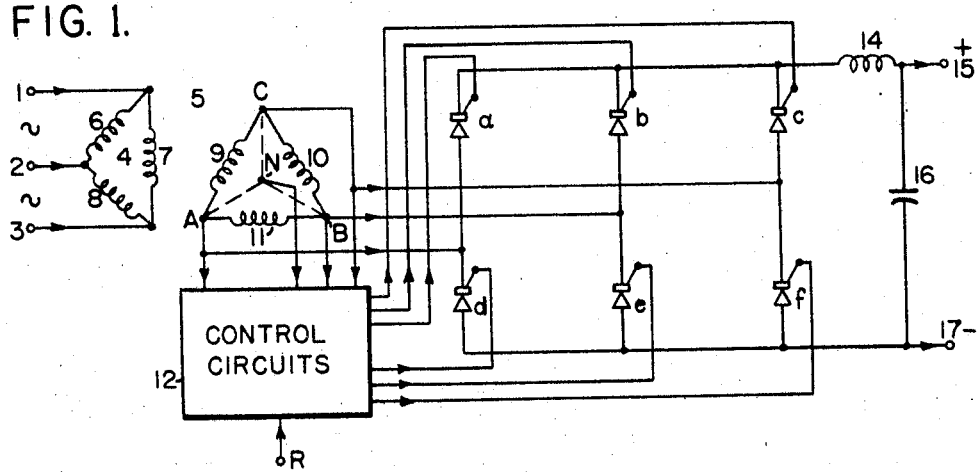

This invention relates to a method of controlling electrical rectifiers by altering the period of current flow therethrough and to means for carrying out the method.

Regulated power supplies employing silicon controlled rectifiers are known to the art. Such known devices employ a time constant circuit, frequently including a capacitor and a resistor, to determine the control exercised upon the duration of current flow through controlled rectifiers. The time constant results in delay in regulation. This condition has been accepted as unavoidable by the prior art, and as acceptable in that a high degree of regulation has not been attained.

Rather than employing such a circuit, I have found that if the phase to neutral voltages at the input of a three-phase full wave bridge controlled rectifier are compared to a fixed reference voltage and appropriate controlled rectifiers are fired when the instantaneous value of these phase to neutral voltages become successively less than the reference voltage, the resulting average output voltage from the controlled rectifier bridge is directly proportional to only the fixed reference voltage. The average output voltage is a linear function of the reference voltage over all conduction angles for which the input filter reactor is large enough to maintain continuous conduction. The average output voltage is totally independent of voltage changes of the input power line.

Full correction of a voltage change occurs in one-sixth cycle; or 3 milliseconds for 60 cycle power source, or 420 microseconds for a 400 cycle power source. The correction is completed without servo overshoot or time lag, since a closed servo loop is not involved.

Stated in a practical way, the method of this invention has made it possible to build a three-phase regulated power supply supplying 1,300 amperes at 240 volts with a regulation accuracy of 0.01%. This will be recognized as transcending the capabilities of the prior art.

While this method has been stated in the paragraphs above in specific terms for directness and clarity, it will be understood that it is capable of much wider application. In essence, it is the firing of a controlled rectifier at the threshold determined by the decreasing excursion of a selected alternating voltage below an adjustable but normally constant reference voltage. In passing, it should be noted that the art has invariably fired a controlled rectifier by a positive-going pulse or waveform having an increasing excursion. This is the simplest and normally considered appropriate type of waveform to employ, but because of this custom the art has overlooked the highly desirable control waveform that is employed according to this invention.

The method can be applied by either of two apparatuses; one employing controlled switches and another employing transistors to sense the conjunction of the waveforms mentioned and to provide a firing pulse for the controlled rectifiers timed in accordance with the said conjunction.

An example of the controlled switch is the known silicon controlled switch. This device is characterized by the fact that the gate electrodes are capable of not only initiating current flow between cathode and anode, but of causing this current flow to cease upon receiving an appropriate potential.

In this invention a silicon controlled switch is connected to a transformer secondary for each of plural phases (typically three phases), and to an adjustable but otherwise constant voltage reference source to produce an appropriately timed pulse to fire the silicon controlled rectifier of the phase involved.

In the alternate embodiment transistors are connected to form a pulse generator of the order of a Schmitt trigger. Appropriate voltages are impressed from a transformer secondary upon the Schmitt trigger to turn it both on and off. It is turned off at the proper time to fire the silicon controlled rectifier with which it is associated. Through a pulse transformer the negative-going excursion of the Schmitt trigger is converted into a suitable positive-going pulse to fire the silicon controlled rectifier.

An object of this invention is to provide power supply regulation by sensing the conjunction of an alternating voltage waveshape and a constant voltage datum.

Another object is to control the phase angle of passage of current by a rectifier by means that are essentially instantaneously operative.

Another object is to provide a control for the regulation of a rectifier that is not sensitive to changes in frequency.

Another object is to employ an alternating voltage waveshape for rectifier regulation wherein coincidence with a fixed voltage results in an average voltage value that is proportional to the rectified voltage output of the device independent of the voltage of the input power line.

Another object is to provide a control for a rectifier which gives a linear relationship of control reference voltage to output voltage without the use of feedback methods.

Other objects will become apparent upon reading the following detailed specification and upon examining the accompanying drawings, in which are set forth by way of illustration and example certain embodiments of this invention.

Figure 2:
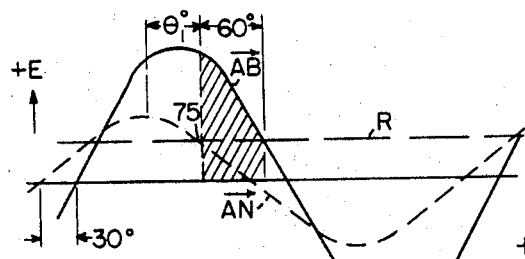
Figure 3:
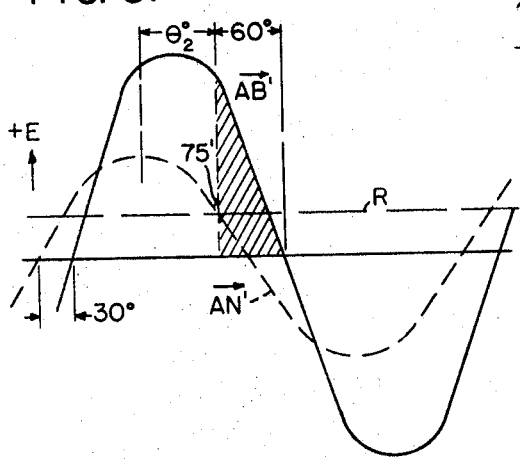
Figure 7:
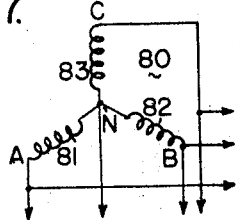
Figure 4:
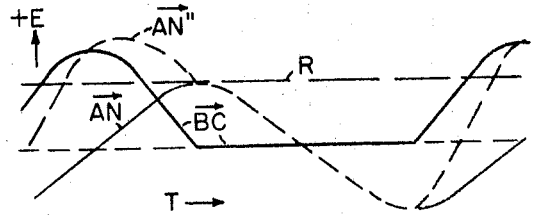
Figure 5:
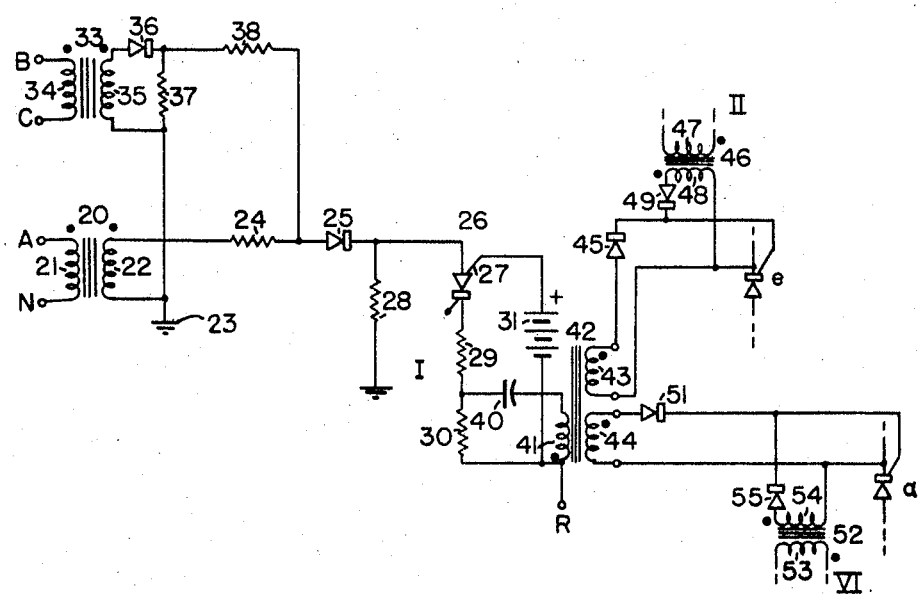
Figure 6:
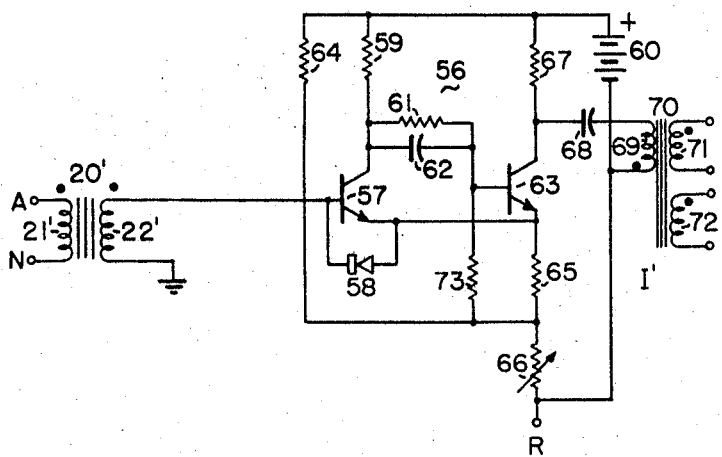
Figure 8:
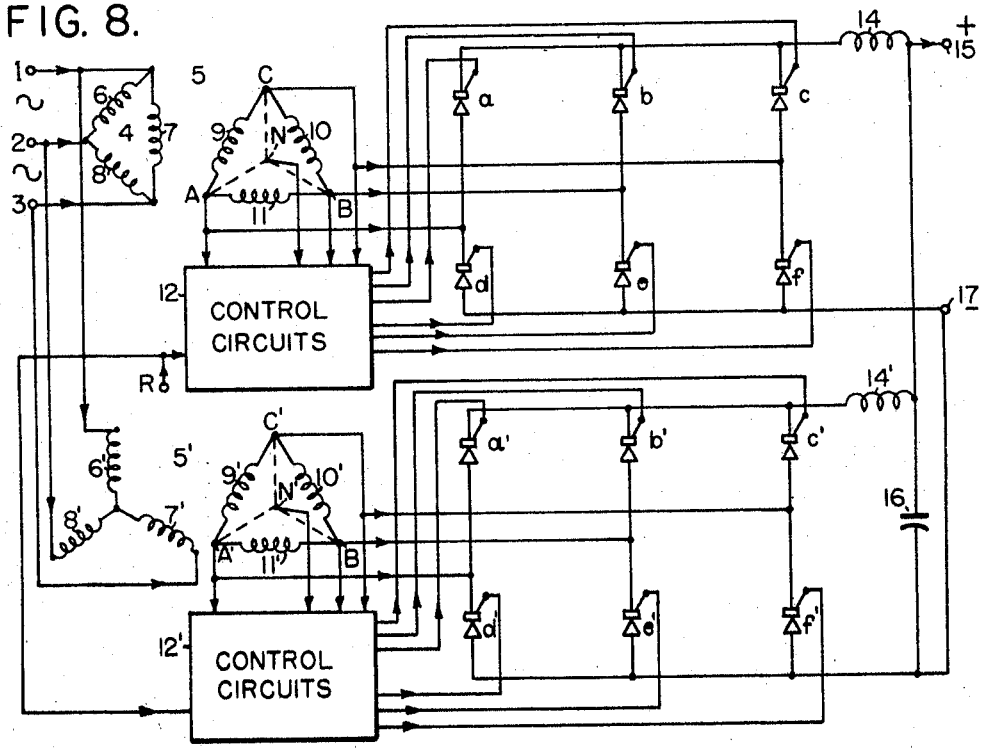
Figure 9:
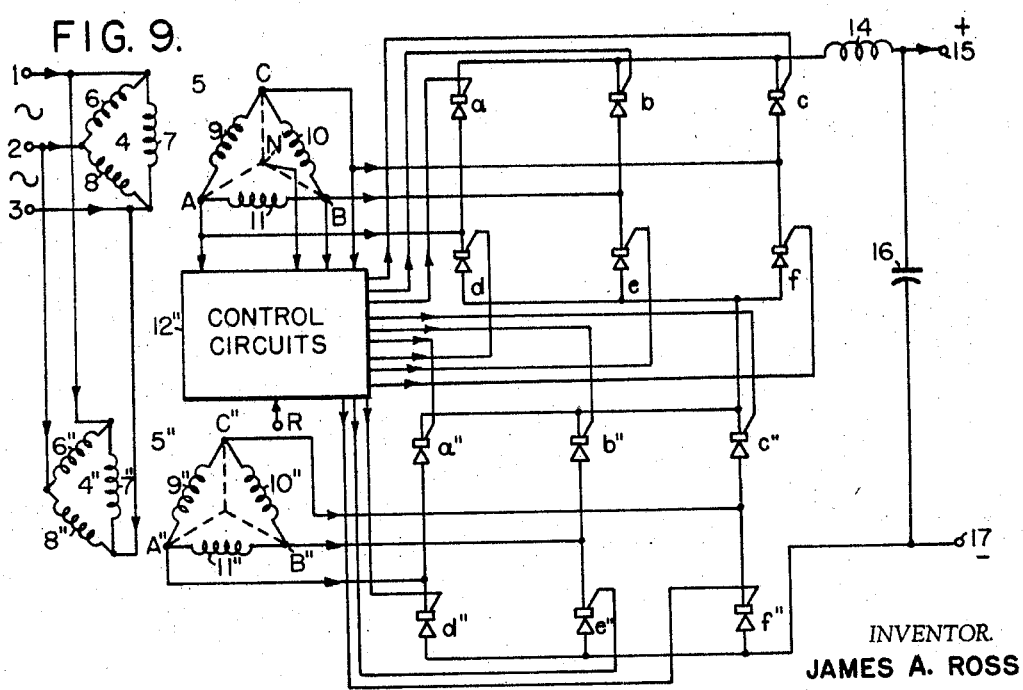

FIGURE 1 is a diagram, largely schematic, of the whole of a three-phase rectifier according to this invention, FIG. 2 illustrates waveforms of one phase, having to do with phase control of the controlled rectifier thereof, FIG. 3 illustrates the same, but with a different amplitude of incoming line voltage, FIG. 4 illustrates the control waveform of FIG. 2 as combined with an auxiliary waveform to provide determinancy at peak values of regulation, FIG. 5 is the schematic diagram for the "control circuit" block of FIG. 1 in which a silicon controlled switch is employed, FIG. 6 is the schematic diagram for the "control circuit" block of FIG. 1 in which transistors forming a Schmitt trigger pulse generator are employed, FIG. 7 is a fragmentary schematic diagram of a Y-connected alternate embodiment for the power transformer of FIG. 1, FIG. 8 is a diagram of the whole of a double three-phase rectifier having a twelve-phase output ripple, and FIG. 9 is a diagram of the whole of a cascaded three-phase rectifier to provide high output voltage.

In FIG. 1 terminals 1, 2, 3 connect to the known three-phase electric power line to provide the basic source of electric power for the rectifier of this invention. A primary winding 4 of a three-phase transformer 5 has three windings 6, 7, 8 and the usual core (not shown). Transformer 5 also has three secondary windings 9, 10, 11 and a neutral connection N, the latter indicated schematically in FIG. 1. The transformer is connected delta-delta.

The power rectifiers are designated a, b, c, d, e, f in FIG. 1 and are typically semiconductor devices, such as silicon controlled rectifiers. The basic requirement is that the interval during the alternating current within which current is allowed to flow through the rectifier regardless of the voltage across it tending to establish such a current flow be controllable. This is often referred to as a "phase" control. The exact commercially obtainable type of controlled rectifier is subject to wide variation depending upon the voltage and current capabilities of the device and upon the rating demanded of the whole rectifier. For the practical example previously referred to, three silicon controlled rectifiers in parallel were employed for each of the designated rectifiers a, b, c, d, e, f in FIG. 1. For one-third the current rating of the whole rectifier only one rectifier device would be needed for each position, and so on.

In the secondary of delta-connected transformer 5 the extremities of the secondary windings 9, 10, 11 are labelled A, B, C, in accordance with accepted nomenclature. Junction A connects to the anode of silicon controlled rectifier a and the cathode of rectifier d. Junction B connects to the anode of rectifier b and the cathode of rectifier e. Junction C connects to the anode of rectifier c and to the cathode of rectifier f. These connections supply the main power to these power controlled rectifiers.

Control circuits for rectifiers a through f are schematically represented in FIG. 1 by block 12; while in FIGS. 5 and 6 alternate embodiments of one of six control circuits are detailed, being identified as Roman numeral one, I. The six control circuits must be properly interconnected in FIG. 1 in order that control will be synchronized with the timing of the three phases of power from the power line. This detail is given below.

For control circuit I, transformer primary 34 in FIG. 5 connects to junction terminals B and C in FIG. 1. Transformer primary 21 connects to A and N in FIG. 1. Diode 51 at the output of FIG. 5 connects to the control electrode of rectifier a in FIG. 1. Diode 45 connects to the control of rectifier e in FIG. 1.

In a like manner, for control circuit II, a separate equivalent of transformer primary 34 connects to terminals A and C. An additional and separate transformer primary 21 connects to N and B. The equivalent of diode 51 (which is diode 49 in FIG. 5) connects to the control of rectifier e. Diode 45 connects to the control of rectifier c.

For control circuit III, winding primary 34 connects to terminals A and B. Primary 21 connects to C and N. Diode 51 connects to the control of rectifier c. Diode 45 connects to the control of rectifier d.

For control circuit IV, primary 34 connects to terminals C and B. Primary 21 connects to N and A. Diode 51 connects to the control of rectifier d. Diode 45 connects to the control of rectifier b.

For control circuit V, primary 34 connects to terminals C and A. Primary 21 connects to B and N. Diode 51 connects to the control of rectifier b. Diode 45 connects to the control of rectifier f.

For control circuit VI, primary 34 connects to terminals B and A. Primary 21 connects to N and C. Diode 51 connects to the control of rectifier f. Diode 45 (which is diode 55 in FIG. 5) connects to the control of rectifier a.

A D.C. reference voltage is also impressed upon the control circuits at terminal R in FIG. 1. This voltage is typically 2 to 20 volts at positive polarity to the control circuits. It is adjusted within this range for the purpose of setting the value of the output voltage from the whole rectifier. It may be provided by a battery or an A.C. to D.C. rectifier-filter power supply.

Connections are also shown emanating from the control circuits block 12 and passing to each control electrode of the power silicon controlled rectifiers a, b, c, d, e, f. These are schematic of two connections from the secondary of a pulse transformer in each case, as will be noted at the right of FIG. 5 for silicon controlled rectifiers e and a. These connections convey the voltage pulse which determines when each such controlled rectifier shall be turned on in the operating sequence of the rectifier. These connections have been detailed for the six control circuits I through VI, above.

Further with respect to FIG. 1, the cathodes of controlled rectifiers a, b, c are connected together and to one terminal of filter choke 14. The other terminal of this choke connects to the positive output terminal 15 of the whole rectifier, and also to one terminal of capacitor 16. The anodes of controlled rectifiers d, e, f are connected together and to negative output terminal 17 of the whole rectifier. The second terminal of capacitor 16 also connects to terminal 17.

The detail of the control circuits block 12 of FIG. 1 will now be supplied by a consideration of the embodiment thereof of FIG. 5.

Control transformer 20 of FIG. 5 is of low power control circuit size and is typically of 2 to 1 stepdown ratio. Primary 21 thereof connects to junctions A and N of main transformer 5 secondary, as has been previously indicated. One terminal of secondary 22 of transformer 20 is connected to ground 23. The other terminal connects to summing resistor 24, which may have a resistance of 20,000 ohms. Resistor 24, in turn, connects in series with (semiconductor) diode 25 to the anode of device 26. Diode 25 is for the protection of gatable semiconductor device 26, of which device the silicon controlled switch is an example. In such a device the control electrode 27 exercises greater control over cathode an anode flow of current than does the control electrode of a silicon controlled rectifier. The control electrode of a silicon controlled switch is capable of stopping the current flow as well as starting it.

Resistor 28 connects from the cathode of diode 25 to ground and may have a resistance of one megohm. The cathode of diode 25 connects also to the anode of silicon controlled switch 26. Since this switch is employed for control purposes only it may be of small power-handling capability, such as the type 3N60. The cathode thereof connects to resistors 29 and 30 in series, which resistors may have resistances of 100 and 680 ohms, respectively.

The lower extremity of resistor 30 connects to the source of reference voltage, previously described, at terminal R. Also connected to this terminal is the negative terminal of a "floating" battery 31, the positive terminal of which connects to control electrode 27, also "floating." With respect to silicon controlled switch 26 it is to be noted that the second control terminal, which is connected to the cathode, is not used.

An additional input to silicon controlled switch 26 is a rectified alternating voltage waveshape, as $\overline{BC}$ of FIG. 4. This input is originally provided by peak transformer 33. This transformer typically has a 4 to 1 stepdown ratio and is of the same type as transformer 20. Primary 34 connects to junctions B and C of the main transformer 5 secondary, in the name general manner as before. One terminal of secondary 35 of transformer 33 connects to rectifier 36, which may be an instrument type semiconductor diode. It is this rectifier that provides the rectification to be noted in waveform $\overline{BC}$ of FIG. 4. Resistor 37 connects to the cathode of rectifier 36 and to the second terminal of secondary 35, which terminal also connects to ground 23. Resistor 37 may have a resistance of 500 ohms and provides for a low impedance source for summing resistor 38 during the negative half cycle of voltage $\overline{BC}$.

The output of this section of the control circuit is connected to the output from transformer 20 through summing resistor 38, of 20,000 ohms, to the junction between resistor 24 and diode 25. The combined outputs of these two parts of input circuits 20 and 33 are thus impressed upon the anode of silicon controlled switch 26, as an input thereto.

The output of silicon controlled switch 26 is taken from the junction between resistors 29 and 30 via capacitor 40, of 0.025 microfarad capacitance, for example, and from the second terminal of resistor 30, which terminal is also connected to the DC reference voltage at terminal R; this being the same R an shown in FIG. 1. The output is impressed upon primary 41 of pulse transformer 42. This transformer is of the usual pulse type, having typically a toroidal core and a diameter of the order of one-half inch. Transformer 42 has two equivalent secondaries, both having a one-to-one turns ratio with respect to primary 41.

The small black dots at the top ends of the windings on input transformers 20 and 33 indicate that the polarity (the direction of winding) of the primaries and the secondaries is the same. However, with pulse transformer 42 these dots are reversed. This indicates that a negative pulse in primary 41 will provide a positive pulse at each secondary. This is so arranged because a positive pulse is required to fire the main silicon controlled rectifiers $a$, $b$, $c$, $d$, $e$, $f$ into conduction.

In FIG. 5, secondary 43 of this control circuit I is connected to the control electrode of main silicon controlled rectifier $e$ and secondary 44 is connected to control main silicon controlled rectifier $a$. The upper terminal of secondary 43 connects to the anode of diode 45, which is employed to prevent loading of control circuit I when control circuit II delivers a pulse to the same silicon controlled rectifier $e$. The cathode of diode 45 connects directly to the control terminal of silicon controlled rectifier $e$. Diode 45 also prevents negative "spikes" of voltage from reaching the control terminal, as arise when silicon controlled switch 26 turns on, which would damage the silicon controlled rectifier. The anode and the cathode of silicon controlled rectifier $e$ are connected as shown in FIG. 1.

More than one control circuit controls each silicon controlled rectifier of the main rectifier. This is shown in FIG. 5 by pulse transformer 46. The primary thereof connects to a circuit exactly the same as that previously described with respect to FIG. 5; from primaries 21 and 34 through primary 41. Primary 47, corresponding to primary 41, connects to control circuit II, whereas primary 41 is a part of control circuit I. The connections between each of the six control circuits and the secondary given.

Secondary 48 of transformer 46 has a reversed polarity with respect to primary 47, as was the case with transformer 42. The terminal of secondary 48 having the dot connects to the anode of diode 49 and the cathode of that diode connects to the control terminal of silicon controlled rectifier $e$. The other terminal of this secondary connects to the cathode of silicon controlled rectifier $e$. These connections are equivalent to those of previously described secondary 44 and are exemplary of the connections of all of the control circuits to all of the silicon controlled rectifiers.

Not only does control circuit I connect to main silicon controlled rectifier $e$, but it also connects to main silicon controlled rectifier $a$. Each control circuit connects to two main silicon controlled rectifiers so that a complete path for current exists through two silicon controlled rectifiers, a transformer winding and the load each time one of the control circuits delivers an output pulse. An output pulse is generated when a silicon controlled switch turns off.

Thus, the dot terminal of secondary 44 connects to the anode of low power type diode 51, the cathode of which connects to the control electrode of main silicon controlled rectifier $a$. The second terminal of secondary 44 connects to the cathode of main silicon controlled rectifier $a$.

Following the pattern above, an input from control circuit VI is also impressed upon main silicon controlled rectifier $a$. From a transformer 52, having a primary 53 connected to control circuit VI, secondary 54 has a dot terminal connected to the anode of diode 55, the cathode of which connects to the control terminal of main silicon controlled rectifier $a$. The second terminal of secondary 54 connects to the cathode of main silicon controlled rectifier $a$. The circuit of this rectifier is completed for power as shown in FIG. 1.

FIG. 6 illustrates an alternate type of controlled circuitry. The input circuit is simpler than in FIG. 5 and silicon controlled switch 26 in replaced by Schmitt trigger 56, the latter being exemplary of a pulse generator. It is possible to employ the simplified input circuit of FIG. 6 in the circuit of FIG. 5, or to employ the peak-supplying input circuit of FIG. 5 in the circuit of FIG. 6.

Accordingly, elements 20' through 23' are constituted, connected and operated as elements 20 through 23 in FIG. 5. A resistor 24', corresponding to prior resistor 24, is not required, since two waveforms are not summed as in FIG. 5. The dot terminal of secondary 22' connects to the base electrode of first Schmitt trigger transistor 57; which may be an NPN type 40053 transistor. A protection diode 58 is connected across the base to emitter terminals of the transistor, with the cathode of the diode connected to the base of the transistor. The collector of transistor 57 connects to resistor 59, of 2,000 ohms resistance. This, in turn, connects to the positive terminal of battery or equivalent power source 60, which may typically have a voltage of 20 volts. This battery "floats"; the negative terminal thereof is connected to the reference voltage terminal R.

Resistor 61 and capacitor 62 are connected in parallel and from the collector of transistor 57 to the base of transistor 63. The resistor may have a resistance of 20,000 ohms and the capacitor a capacitance of 0.001 microfarad. One terminal of resistor 73 also connects to the base of transistor 63 and the other terminal connects to one terminal of resistor 64, the second terminal of which resistor connects to the positive terminal of battery 60. Resistor 73 may have a resistance of 10,000 ohms and resistor 64, 5,000 ohms. Resistor 65 is connected to the emitter of transistor 63, also to the tetrminal of resistor 73 which also connects to resistor 64, and also to one terminal of variable resistor 66. The second terminal of resistor 66 connects to terminal R. Resistor 65 may have a resistance of 1,000 ohms and resistor 66 a maximum of 2,000 ohms. Adjustment of the resistance value of resistor 66 adjusts the offset voltage of the Schmitt trigger, so that the transition from the "on" state to the "off" state occurs at zero voltage, from the base of transistor 57 to reference voltage R. Increasing this resistance causes the transition to occur at a negative relative voltage and decreasing this resistance causes the transition to occur at a positive relative voltage.

The emitters of transistors 57 and 63 are connected together. The emitter of transistor 63, which may also be of the 40053 type, connects to the rest of the circuit through resistor 65. The collector of transistor 63 connects to resistor 67, of 2,000 ohms, and therethrough to the positive terminal of battery 60. This collector also connects to one terminal of capacitor 68, of 0.1 microfarad capacitance, while the second terminal of capacitor 68 connects to the nondot terminal of primary 69 of pulse transformer 70. The dot terminal of the primary connects to terminal R.

Transformer 70 is the equivalent of transformer 42 of FIG. 5. Secondary 71 is the equivalent of secondary 43 and secondary 72 is the equivalent of secondary 44. The connections to the apparatus beyond the secondaries in FIG. 6 are the same as beyond the secondaries in FIG. 5; thus these have not been repeated in FIG. 6.

The operation of the control circuits of FIGS. 5 and 6 will be explained with the aid of the waveforms of FIGS. 2 through 4.

The over-all purpose of the control circuits is to turn the respective silicon controlled rectifiers "on" later in the cycle of alternating voltage from the three-phase lines when that voltage has increased from what may be termed a normal value, and vice versa. This keeps the average output voltage from the rectifier constant, which is the result sought.

FIG. 2 shows what may be considered a normal amplitude of voltage of one phase, AB. This is the voltage across winding 11 of the secondary of transformer 5 in FIG. 1. This is preceded by the voltage AN, from terminal A to the neutral, which voltage leads the voltage AB by 30 electrical degrees. One cycle of each is shown; the AB voltage by a full line and the AN voltatge by a dotted line. The reference voltage R is constant and is shown by a dashed line.

In the operation of the control circuits I through VI, an output from control circuit I occurs when the voltage AN applied to transformer primary 21 decreases to the value of reference voltage R; i.e., point 75 in FIG. 2. An output from control circuit I then triggers "on" silicon controlled rectifiers $a$ and $e$. These rectifiers provide a continuous path for current from terminal A of the transformer secondary through filter reactor 14, through the external load and to transformer secondary terminal B. Main silicon controlled rectifiers $a$ and $e$ conduct for a period of approximately 60 electrical degrees, or until the voltage NB at the input of control circuit II corresponding to primary 21 decreases to the value of reference voltage R.

An output from control circuit II then turns "on" rectifier $c$. At this time the phase voltage CB is aprroximately the same amplitude as phase voltage AB was 60° earlier; corresponding to point 75 in FIG. 2. The conduction path is now from terminal C through rectifier $c$, the load, and returning through rectifier $e$ to terminal B. The trigger pulse provided by control circuit II to rectifier gate $e$ is necessary only if current in the reactor 14 was not continuous during the previous conduction period, since rectifier $e$ was previously turned "on" by control circuit I. At the time control circuit II delivers an output pulse the phase voltage from C to B is greater than the phase voltage from A to B, thus the rectifier $a$ anode to cathode voltage is negative and conduction through rectifier $a$ stops.

In an identical manner approximately 60° later, circuit III delivers an output pulse when its input voltage, CN, connected to its equivalent winding 21 decreases to the value of reference voltage R. Its output pulse turns "on" rectifier $d$. Since phase voltage CA is then greater than phase voltage CB, rectifier $e$ anode to cathode voltage is negative and conduction through rectifier $e$ stops.

In an identical manner after approximately another 60°, circuit IV delivers an output pulse when its input voltage, NA, decreases to reference voltage R. This output turns "on" rectifier $b$. Phase voltage BA is then greater than CA. Rectifier $c$ anode to cathode voltage is then negative and conduction stops.

In an identical manner after approximately another 60°, circuit V delivers an output pulse when its input voltage, BN, decreases to reference voltage R. This output turns "on" rectifier $f$. Phase voltage BC is then greater than BA. Rectifier $d$ anode to cathode voltage is then negative and conduction stops.

In an identical manner after approximately another 60°, circuit VI delivers an output pulse when its input voltage, NC, decreases to reference voltage R. This output turns "on" rectifier $a$. Phase voltage AC is then greater than BC. Rectifier $b$ anode to cathode voltage is then negative and conduction stops.

This process continues in rotation to control circuit I again, and so on repeatedly.

Turning now to the dynamics of the voltage adjusting process, FIG. 3 shows one complete cycle of input voltage, the same cycle as shown in FIG. 2. However, the incoming line voltage has now increased in amplitude, due to some circumstance over which the operator of the rectifier has no control and which it is wished to eliminate from the voltage of the rectified output. The amplitude of voltage AB' in FIG. 3 is greater than that of voltage AB in FIG. 2. Correspondingly, the amplitude of voltage AN' is greater than that of voltage AN. Since the level of the reference voltage R remains constant, the leading voltage to neutral, AN', will reach the level R later in the alternating cycle of FIG. 3 than the corresponding AN voltage did in FIG. 2. The silicon controlled rectifiers controlling the AB phase, i.e., $a$ in FIG. 1, will thus be triggered "on" later. Conduction ceases 60° later, as before. Thus, equality of average voltage output for the two situations will be qualitatively noted in FIGS. 2 and 3 by the equality of the shaded areas under the AB and the AB' curves. Equality of the average voltage output under changing input voltage conditions is, of course, the distinguishing characteristic of a voltage-regulated rectifier.

Analytically, the output voltage of a phase-controlled three phase bridge rectifier is the line-to-line RMS input voltage times $\pi/3\sqrt{2}$ times cos $\theta$, where $\theta$ is the delay firing angle, measured from 30 electrical degrees ahead of the peak line-to-line voltage. In FIG. 2, control voltage AN is a cosine function satisfying the above requirement by leading the line-to-line voltage AB by 30 electrical degrees.

By inspection, if V equals the RMS line-to-line voltage AB, then the peak value of voltage AN equals $V\sqrt{2}/\sqrt{3}$, and cos $\theta$ equals $\sqrt{3} \cdot R/V\sqrt{2}$. R is the reference voltage shown in FIG. 2. Substituting for cos $\theta$ in the (first) bridge output equation given above gives the DC output voltage of the rectifier equal to $\pi R/2\sqrt{3}$. It is important to note that the magnitude of the input power voltage, V, does not appear in the last equation. Thus, the average output voltage is affected only by changes in the reference voltage R, and this voltage can be kept accurately constant when desired and can be adjusted to adjust the output voltage.

While the above conditions accurately hold, there is a situation at one extreme of the regulating range where the control tends to be indeterminate. This occurs when the voltage $\overline{AB}$ in FIG. 2 decreases about 33%. The $\overline{AN}$ voltage decreases correspondingly and thus the turn-"on" point 75 becomes indefinite. This is because point 75 is at the top of the $\overline{AN}$ waveform and there is no definite decrease of that waveform to the R voltage level; the condition for the production of an output pulse from the appropriate control circuit.

This situation is prevented by the addition of waveform $\overline{BC}$, as shown in FIG. 4. This voltage is rectified and is supplied by elements 33 through 38 in FIG. 5. In FIG. 4 the addition of voltage waveforms $\overline{AN}$ and $\overline{BC}$ results in waveform $\overline{AN}''$, which waveform has a hump at the top of what was formerly waveform $\overline{AN}$. This new waveform provides a determinate crossing of this control waveform and the reference level voltage R, even when the control adjustment calls for maximum amplitude of voltage across the power silicon controlled rectifiers when these are fired early to compensate for low input line voltage.

It is thus seen that my discovery of the correspondence between the phase to neutral voltage in a three phase power system with the average voltage output of a rectifier and the invention of apparatus to use this correspondence for the control of the phase angle of conduction in rectifiers of a rectifier device provides such apparatus of very great speed of regulation. This is "intracycle" (i.e., within one cycle) control of output for line voltage variations and also a means of control that is independent of the frequency of the source of the line voltage power input.

Certain further alternate embodiments of the invention are possible.

Rather than the delta-connected transformer 5 in FIG. 1 a Y-connected transformer may be employed. The secondary of this transformer is shown at 80 in FIG. 7. This Y-connected secondary connects to the remainder of the circuit of FIG. 1 at the points where the arrows are shown on the conductors that extend to the right and extend downward in both figures; i.e., three at the right and four downward. Secondary 80 is substitutional for delta-connected secondary 9, 10, 11 of FIG. 1. In FIG. 7 it will be noted that the neutral connection N is available at the inner juncture of windings 81, 82, 83. The equivalent of this is obtained in the embodiment of FIGS. 1 and 5 by means of Y-connected resistors of reactors.

It will be understood that the primary winding (not shown) of the transformer in FIG. 7, may also be Y-connected. Also, transformer 5 of FIG. 1 may be delta-Y or Y-delta connected to obtain desired voltage transformations or for other reasons of incidental importance. Also, although a three-phase power transformer has been postulated herein, it may be replaced by three single-phase transformers connected for three-phase operation.

At times it is desired to obtain a twelve-phase ripple from a three-phase rectifier rather than the six-phase ripple obtained with the circuits shown. This is arranged by employing two separate three-phase systems in which the output of one system is shifted 30 electrical degrees from the output of the other. Such a shift is obtained by connecting one primary winding delta and the primary for the other system Y. The outputs are combined through separate filter reactors that connect to a common load, as at terminal 15 of FIG. 1, or through a paralleling reactor into a common filter reactor. Note FIG. 8.

It is also possible to connect two rectifier systems in series to obtain high output voltages. Note FIG. 9. Since the phase for each corresponding controlled rectifier of the two whole rectifiers is the same only one control circuits entity 12'' is required. One additional secondary, being a corresponding duplicate of secondaries 44, 48 and 54 of FIG. 5, is provided to accommodate the difference in potential between corresponding controlled rectifiers, as $a$ and $a''$.

Although this invention has been described in its preferred form with a certain degree of particularity, it is to be understood that this disclosure of the preferred forms has been made only by way of example and that various changes in the characteristics of the circuit elements, details of circuit connections and alteration of the coactive relation between the elements may be made without departing from the spirit and scope of the invention as claimed below.

Having thus fully described my invention and the manner in which it is to be practiced, I claim:

1. The method of regulating a phase-controlled rectifier for providing a constant output voltage regardless of variations in voltage or frequency of a plural phase alternating current electrical input thereto which includes the steps of:
    (a) forming a first voltage from the phase to neutral of each phase of said electrical input, said first voltage having a leading phase angle with respect to the voltage being rectified,
    (b) forming a reference voltage of constant amplitude,
    (c) successively comparing said first voltage with said reference voltage once during each cycle for each phase, and
    (d) switching said controlled rectifier on to rectify current when each said first voltage falls below said reference voltage.

2. The method of claim 1 in which;
    (a) said first voltage leads said voltage being rectified by thirty electrical degrees.

3. The method of regulating a three-phase phase-controlled rectifier for providing a constant output voltage regardless of variations in voltage or frequency of the electrical input thereto which includes the steps of;
    (a) forming the phase to neutral voltage of the three-phase electrical input for each phase of said three phases.
    (b) forming a reference voltage of constant amplitude,
    (c) successively comparing said phase to neutral voltage for each said phase with said reference voltage, and
    (d) switching the said phase-controlled rectifier on, once during each cycle for each said phase to pass current when said phase to neutral voltage of that phase falls below said reference voltage.

4. A three-phase bridge phase-controlled rectifier comprising;
    (a) a source of three-phase electric power having three-phase and neutral terminals,
    (b) six controlled rectifiers connected in a bridge rectifying circuit to said source of power,
    (c) six pulse generating means, each having input, output and common terminals,
    (d) six control transformers, each having a primary and a secondary,
    (e) means to connect the primary of each said control transformer between a three-phase terminal and the neutral terminal of said source of power, with alternate connections oppositely connected with respect to three-phase and neutral terminals,
    (f) means to connect the secondary of each said control transformer to the input terminal of a said pulse generating means,
    (g) one source of reference voltage,
    (h) means to connect the said common terminal of each said pulse generating means to said source of reference voltage whereby each said pulse generating means is turned on when the voltage at its said input terminal is greater than the voltage at its said common terminal,
    (i) six pulse transformers, each having a primary and a secondary,
    (j) means to connect said output terminal of each said pulse generating means to a primary of a said pulse transformer, whereby when each said pulse generating means is turned off when the voltage at its input terminal is less than the voltage at its said common terminal a control pulse is formed at the secondary of each said pulse transformer, and
    (k) means to connect each said secondary of a said pulse transformer to the control electrode of one of said six controlled rectifiers, for initiating conduction therethrough by said control pulse at the appropriate epoch in the cycle of alternating voltage to be rectified to give a constant voltage output from said bridge rectifier regardless of changes in the amplitude of said alternating voltage or in the frequency of alternation thereof at said source of three-phase electric power by thus comparing the phase to neutral voltage of said source of power with said reference voltage.

5. The rectifier of claim 4 in which;
    (a) each said pulse generating means is a semiconductor controlled switch, having an anode, a cathode and an anode gate, (b) each said input terminal connects to the anode of a said controlled switch,
(c) each said output terminal connects to the cathode of a said controlled switch, and
(d) each said common terminal connects to the anode gate of a said controlled switch.

6. The rectifier of claim 4 in which;
(a) each said pulse generating means is a Schmitt trigger circuit, having first and second transistors,
(b) each said input terminal conects to a said first transistor,
(c) each said output terminal connects to a said second transistor, and
(d) each said common terminal connects to both said transistors of a said Schmitt trigger circuit.

7. The rectifier of claim 4 in which;
(a) the secondaries of said control transformers that are connected in opposite phase are interspersed with those that are conected in direct phase amongst the said six controlled rectifiers of said bridge rectifying circuit.

8. The rectifier of claim 7 in which the sequence of the connections of the control transformers with respect to the said phase and neutral terminals of said source of three-phase electric power is;
(a) phase A to neutral,
(b) neutral to phase B,
(c) phase C to neutral,
(d) neutral to phase A,
(e) phase B to neutral, and
(f) neutral to phase C.

9. The rectifier of claim 4 which additionally includes;
(a) six peaking transformers, each having a primary and a secondary,
(b) means to connect the primary of each said peaking transformer across phase to phase terminals of said source of three-phase electric power,
(c) twelve summing resistors,
(d) six diode rectifiers,
(e) means to connect the secondary of each said peaking transformer to one said diode rectifier,
(f) means to connect each said diode rectifier through one said summing resistor to the input terminal of a said pulse generating means the voltage input thereto from its said control transformer which lags in phase the voltage of a secondary from a said peaking transformer by ninety electrical degrees, and
(g) means to conect each secondary of each said control transformer through one said summing resistor to the input terminal of a said pulse generating means, whereby a rectified voltage peak is superimposed upon the alternating voltage from each phase to neutral to make determinate the conjunction between said alternating voltage and said reference voltage.

10. A three-phase bridge type phase-controlled rectifier comprising;
(a) a three-phase power transformer having a primary and a secondary,
(b) six controlled rectifiers connected in a bridge rectifying circuit to said secondary,
(c) six controlled switches, each having an anode, a cathode and an anode gate,
(d) six control transformers, each having a primary and a secondary,
(e) means to connect each control transformer primary between a secondary three-phase terminal of said power transformer and the neutral of the secondary three-phase circuit,
(f) means to connect each control transformer secondary to the anode of a said controlled switch with three of said secondaries having a connection in opposite phase from that of the other three said secondaries,
(g) one source of reference voltage,
(h) means to connect the anode gate of each said controlled switch to said source of reference voltage,
(i) six pulse transformers, each having a primary and two secondaries,
(j) means to connect the cathode of each said controlled switch to a primary of a said pulse transformer, whereby a control pulse is produced in said pulse transformer when each controlled switch is turned off by the voltage at the anode thereof becoming less than the voltage at the anode gate thereof, and
(k) means to connect the secondary of each said pulse transformer to the control electrode of a said controlled rectifier for initiating conduction therethrough by said control pulse at the appropriate epoch in the cycle of alternating voltage to be rectified to give a constant voltage output from said bridge rectifier regardless of changes in the amplitude of the alternating voltage or in the frequency of alternation thereof at the secodary of said power transformer by thus comparing the phase to neutral voltage of said secondary with said reference voltage.

11. The rectifier of claim 10 in which;
(a) said three-phase transformer is connected delta-delta.

12. The rectifier of claim 10 in which;
(a) said three-phase transformer is connected Y-Y 13. The rectifier of claim 10 in which;
(a) said three-phase transformer is connected delta-Y.

14. The rectifier of claim 10 in which;
(a) said three-phase transformer is connected Y-delta.

15. The combination of two three-phase rectifiers according to claim 10 to give a twelve-phase ripple in which;
(a) said primary of the said power transformer of one said three-phase rectifier is delta connected to a source of electric power,
(b) said primary of the said power transformer of the other said three-phase rectifier is Y connected to the same said source of electric power, and
(c) a separate filter reactor is connected to each said bridge rectifying circuit and to a common load.

16. The combination of two three-phase rectifiers according to claim 10 to give an increased voltage output which additionally includes;
(a) means to connect the anodes of the controlled rectifiers of one said bridge rectifier to the cathodes of the controlled rectifiers of the other said bridge rectifier.

17. A three-phase bridge intracycle self-regulating phase-controlled rectifier comprising;
(a) a three-phase power transformer having primary and secondary windings,
(b) six silicon controlled rectifiers, each having a control electrode, and each connected in a bridge rectifying circuit to said secondary windings,
(c) an output filter connected to three of said six silicon controlled rectifiers,
(d) six semiconductor controlled switches, each having an anode, a cathode and an anode gate,
(e) six peak transformers, each having a first primary and a first secondary,
(f) means to connect each said first primary to a secondary winding of said three-phase transformer,
(g) six control transformers, each having a second primary and a second secondary,
(h) means to connect each said second primary between a secondary winding of said three-phase transformer and the neutral thereof,
(i) twelve summing resistors,
(j) six diode rectifiers,
(k) means to connect each said first secondary to one said diode rectifier and through one said summing resistor to the anode of a said controlled switch, three of said first secondaries having a connection in opposite phase to that of the other said three first secondaries in an alternate relation around the three-phase circuit, (l) means to connect each said second secondary through one said summing resistor to the anode of a said controlled switch, three of said second secondaries having a connection in opposite phase to that of the other said three second secondaries, in correspondence with the phase of said first secondaries, and each lagging the phase of the voltage of that of said first secondary by ninety electrical degrees, (m) only one source of adjustable reference voltage, (n) means to connect said anode gate of each said controlled switch to said source of reference voltage, (o) six pulse transformers, each having one primary and two secondaries, (p) six capacitors, (q) means to connect the cathode of each said controlled switch to a primary of a said pulse transformer, and to one said capacitor in a series circuit whereby each said controlled switch is turned off when the voltage at the anode thereof becomes less than that at the anode gate thereof and said capacitor discharges through the primary of said pulse transformer to produce a control pulse, and (r) means to connect each said secondary of a said pulse transformer to the said control electrode of one of said six controlled rectifiers to initiate conduction therethrough by said control pulse at the appropriate epoch in the cycle of the alternating voltage to be rectified, to give a constant average voltage at said output filter regardless of changes in voltage or in the frequency of the alternating voltage in the primary of said power transformer, by thus comparing the phase to neutral voltage of said secondary with the selected value of said adjustable reference voltage.

References Cited

UNITED STATES PATENTS

| | | | |
|---|---|---|---|
| 2,590,180 | 3/1952 | Juhola | 321—40 |
| 2,733,400 | 1/1956 | Hagensick | 321—14 |
| 2,806,197 | 9/1957 | Rockafellow | 323—22 |
| 2,977,523 | 3/1961 | Cockrell | 318—331 |
| 3,075,136 | 1/1963 | Jones | 321—45 |
| 3,095,513 | 6/1963 | Lezan | 307—88 |
| 3,098,977 | 7/1963 | Scaky | 321—40 |
| 3,099,785 | 7/1963 | Kessler et al. | 321—18 |
| 3,127,550 | 3/1964 | Gilbreath et al. | 318—331 |
| 3,146,392 | 8/1964 | Sylvan | 323—22 |
| 3,154,695 | 10/1964 | MacGregor et al. | 307—88 |
| 3,270,272 | 8/1966 | Kurimura | 321—40 XR |
| 3,329,883 | 7/1967 | Frierdich | 321—5 |
| 3,337,792 | 8/1967 | Engelson | 323—22 |
| 3,341,769 | 9/1967 | Grant | 323—22 |
| 3,358,218 | 12/1967 | Halpin | 323—22 |
| 3,222,583 | 12/1965 | Gutzwiller | 381—331 |
| 3,304,486 | 2/1967 | Michaels | 321—18 |

LEE T. HIX, *Primary Examiner.*

WM. SHOOP, *Assistant Examiner.*

U.S. Cl. X.R.

321—18, 47; 323—22, 26, 106